US012574632B2

(12) United States Patent
Ariga

(10) Patent No.: US 12,574,632 B2
(45) Date of Patent: Mar. 10, 2026

(54) IMAGE CAPTURING APPARATUS, MICROPHONE APPARATUS, CONTROL METHOD THEREOF, IMAGE CAPTURING SYSTEM, AND STORAGE MEDIUM

(71) Applicant: CANON KABUSHIKI KAISHA, Tokyo (JP)

(72) Inventor: Yuichi Ariga, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 30 days.

(21) Appl. No.: 18/411,349

(22) Filed: Jan. 12, 2024

(65) Prior Publication Data

US 2024/0244317 A1 Jul. 18, 2024

(30) Foreign Application Priority Data

Jan. 16, 2023 (JP) ................................. 2023-004705

(51) Int. Cl.
*H04N 23/66* (2023.01)
*H04N 5/60* (2006.01)
*H04N 5/77* (2006.01)

(52) U.S. Cl.
CPC ............... *H04N 23/66* (2023.01); *H04N 5/60* (2013.01); *H04N 5/772* (2013.01)

(58) Field of Classification Search
CPC .......... H04N 23/66; H04N 5/60; H04N 5/772; H04N 23/661; H04N 5/765; H04N 7/142; H04N 5/76; H04N 7/147; H04N 23/50; H04N 23/631
See application file for complete search history.

(56) References Cited

U.S. PATENT DOCUMENTS

| | | | | |
|---|---|---|---|---|
| 2005/0200710 A1* | 9/2005 | Suzuki | ................... | H04N 23/00 348/207.99 |
| 2006/0104616 A1* | 5/2006 | Shellshear | ............. | G11B 27/10 386/234 |
| 2007/0030351 A1 | 2/2007 | Blanco | | |
| 2016/0227173 A1* | 8/2016 | Yamaguchi | ............. | G06F 1/163 |
| 2017/0094217 A1 | 3/2017 | Lorenzetti | | |
| 2018/0350405 A1* | 12/2018 | Marco | .................. | G11B 27/031 |

FOREIGN PATENT DOCUMENTS

JP 2021-027408 A 2/2021

OTHER PUBLICATIONS

The above patent documents was cited in a European Search Report issued on Jun. 18, 2024, which is enclosed, that issued in the corresponding European Patent Application No. 23217888.9.

* cited by examiner

*Primary Examiner* — Abdelaaziz Tissire
(74) *Attorney, Agent, or Firm* — Cowan, Liebowitz & Latman, P.C.

(57) ABSTRACT

An image capturing apparatus includes an image capturing device configured to capture an image, an acquisition unit configured to acquire a video recording instruction of the image captured by the image capturing device, a video recording unit configured to perform video recording of the image in response to the video recording instruction; and a control unit configured to control such that a video recording start signal notifying a start of video recording is wirelessly transmitted in response to the video recording instruction.

18 Claims, 8 Drawing Sheets

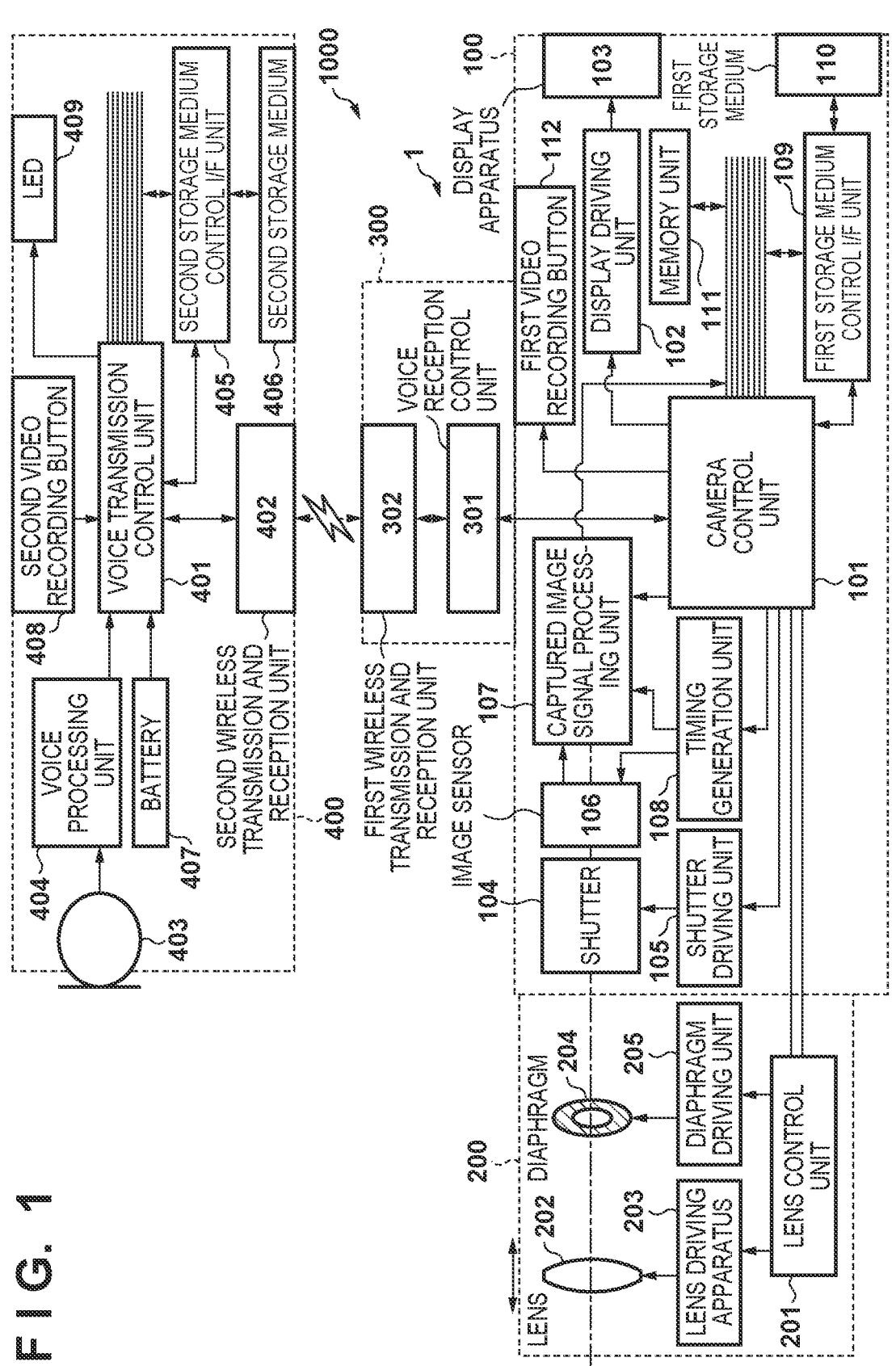
F I G. 1

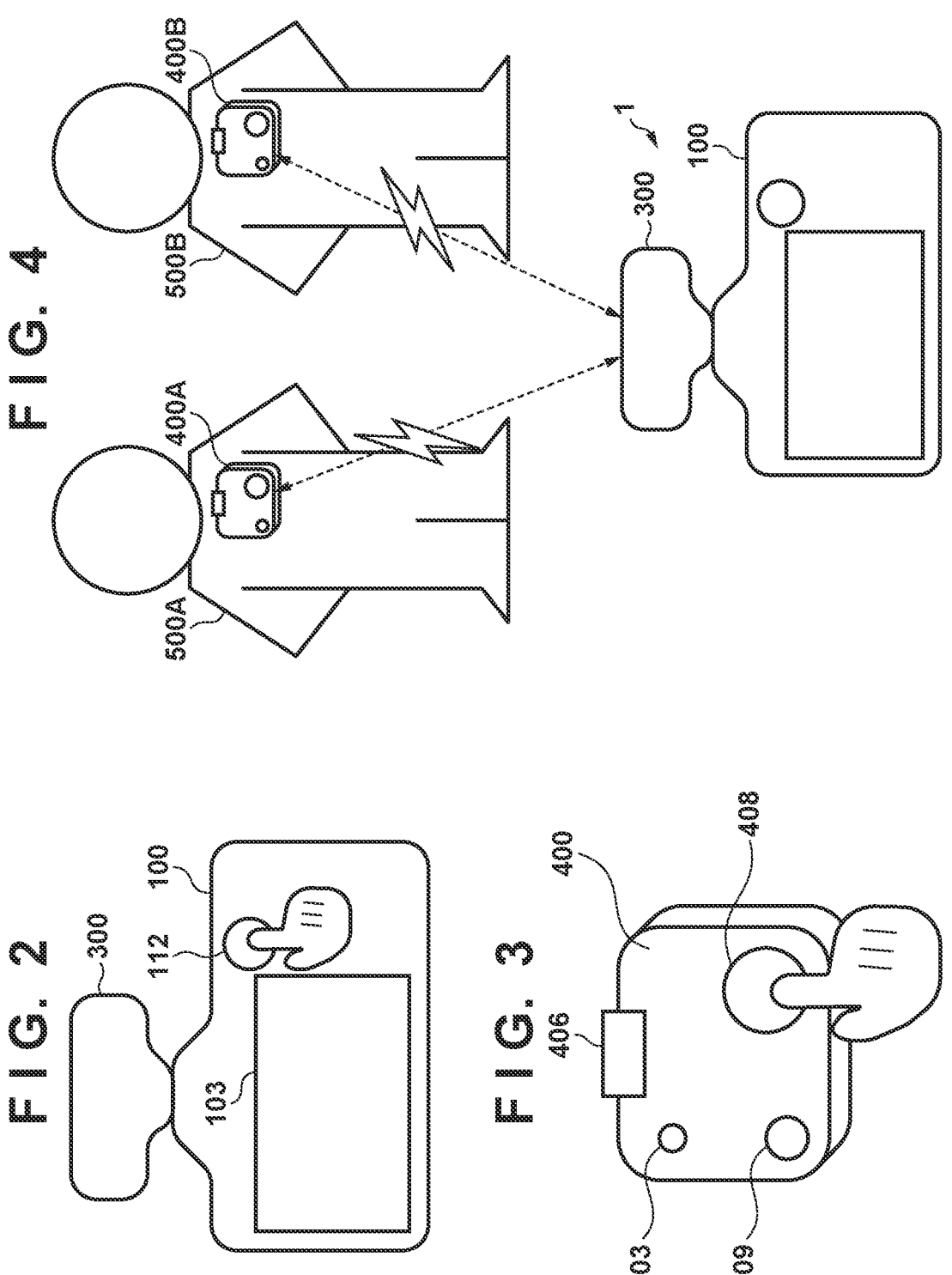

F I G. 6A
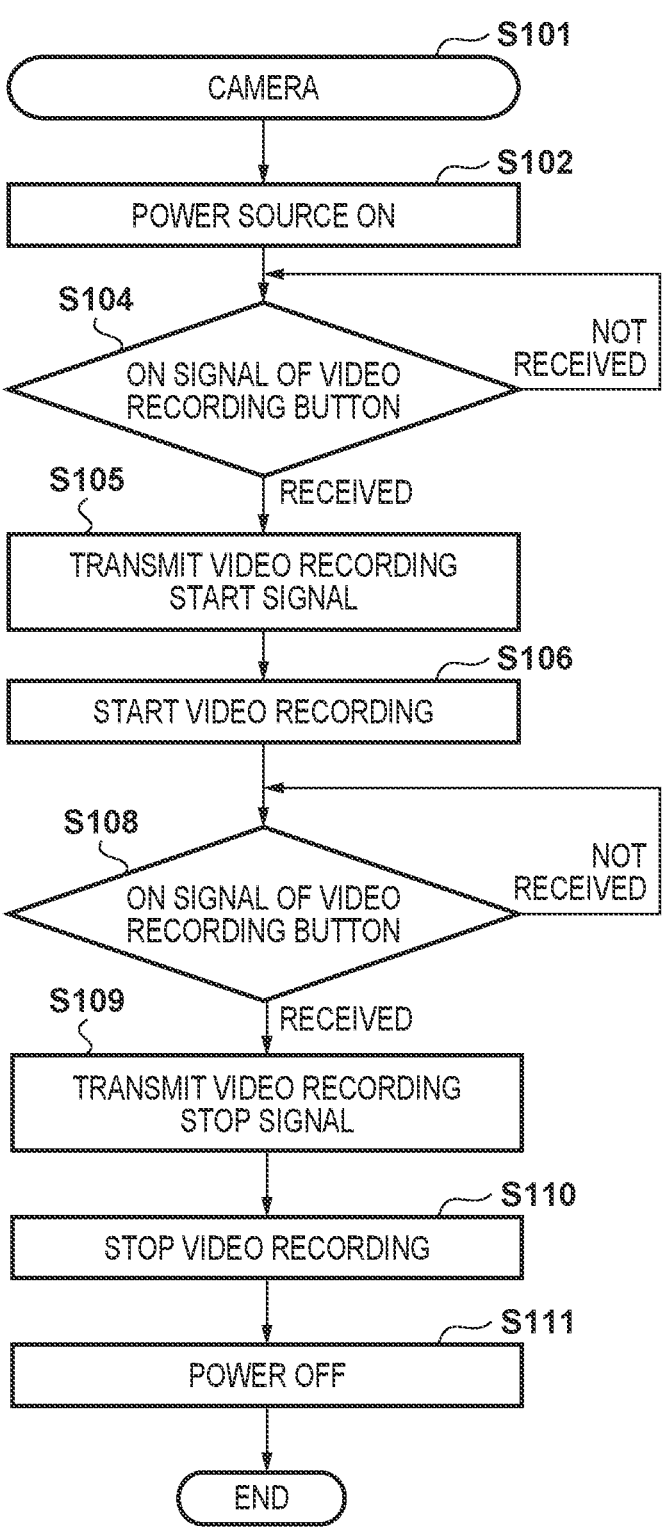

FIG. 6B

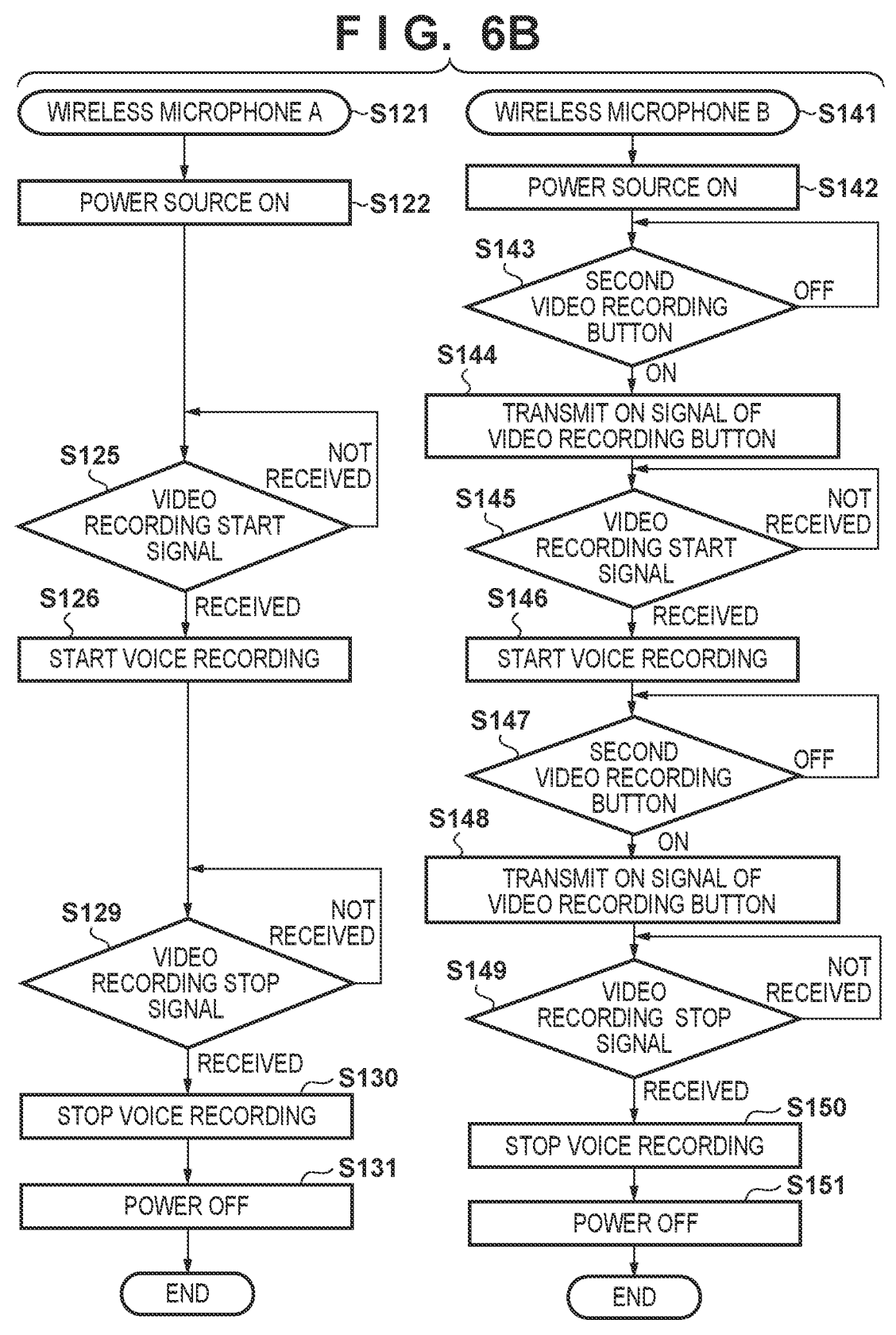

WIRELESS MICROPHONE A ~S121

POWER SOURCE ON ~S122

S125 VIDEO RECORDING START SIGNAL — NOT RECEIVED

RECEIVED

S126 START VOICE RECORDING

S129 VIDEO RECORDING STOP SIGNAL — NOT RECEIVED

RECEIVED

STOP VOICE RECORDING ~S130

POWER OFF ~S131

END

WIRELESS MICROPHONE B ~S141

POWER SOURCE ON ~S142

S143 SECOND VIDEO RECORDING BUTTON — OFF

ON

S144 TRANSMIT ON SIGNAL OF VIDEO RECORDING BUTTON

S145 VIDEO RECORDING START SIGNAL — NOT RECEIVED

RECEIVED

S146 START VOICE RECORDING

S147 SECOND VIDEO RECORDING BUTTON — OFF

ON

S148 TRANSMIT ON SIGNAL OF VIDEO RECORDING BUTTON

S149 VIDEO RECORDING STOP SIGNAL — NOT RECEIVED

RECEIVED

STOP VOICE RECORDING ~S150

POWER OFF ~S151

END

F I G. 8A
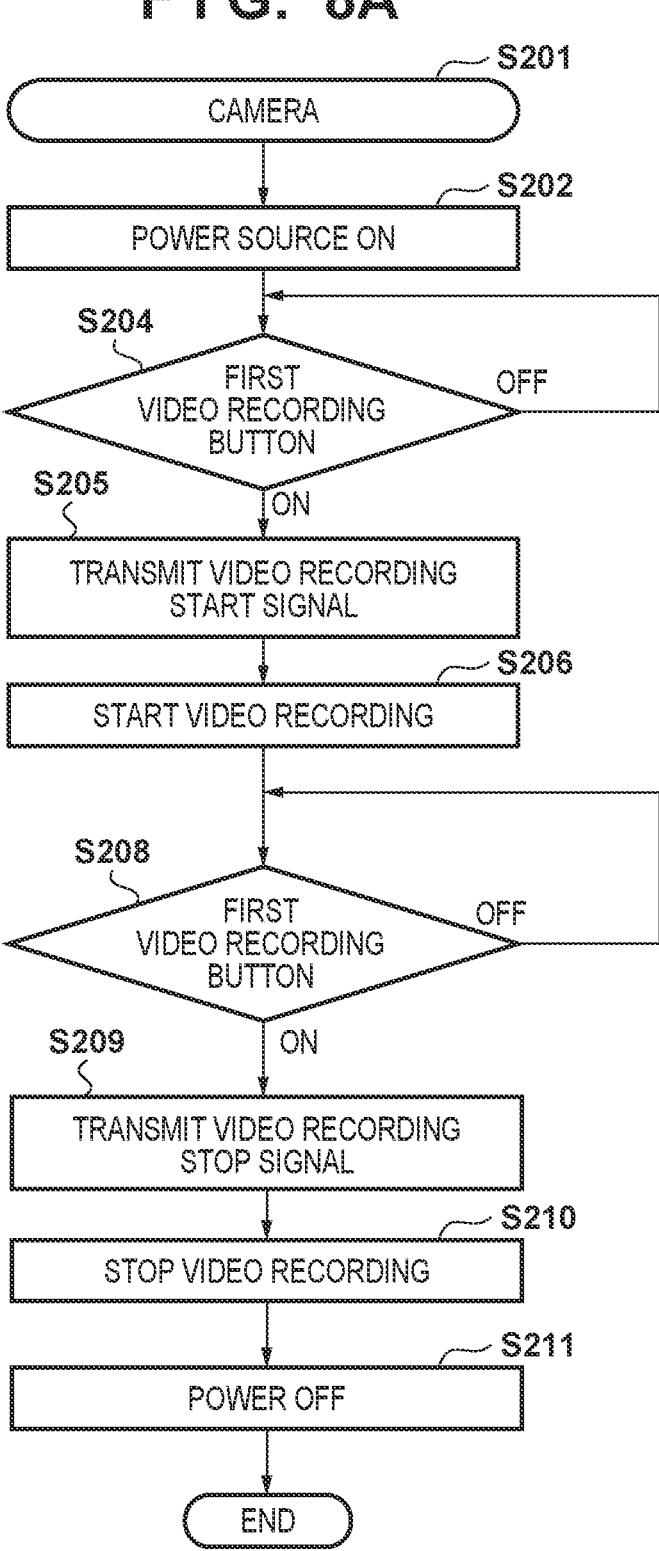

F I G. 8B
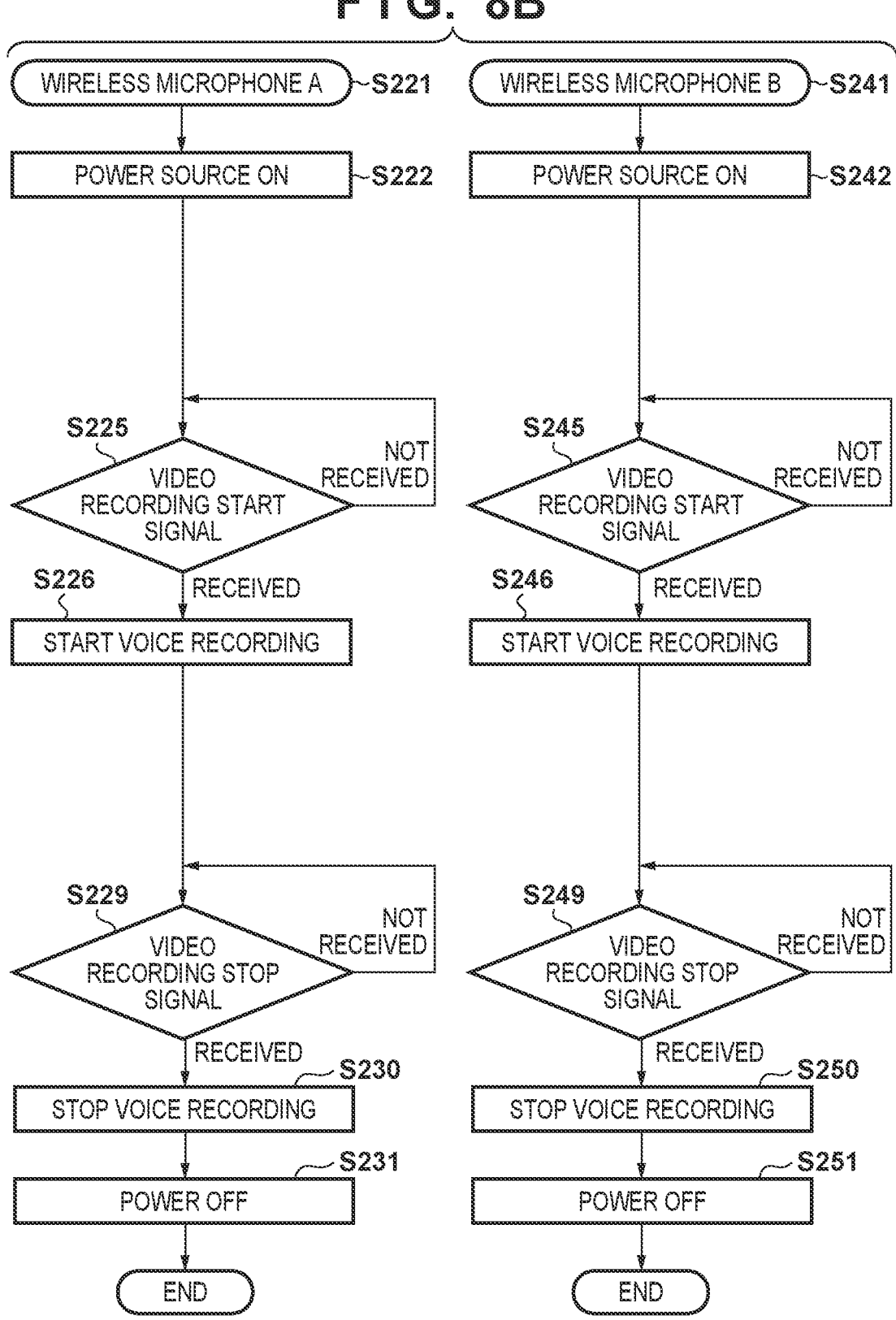

IMAGE CAPTURING APPARATUS, MICROPHONE APPARATUS, CONTROL METHOD THEREOF, IMAGE CAPTURING SYSTEM, AND STORAGE MEDIUM

BACKGROUND OF THE INVENTION

Field of the Invention

The present invention relates to an image capturing apparatus that performs image and voice recording.

Description of the Related Art

Conventionally, when a police officer is on patrol or the like using a vehicle, video is captured by a wearable camera worn by the police officer, and also the video is simultaneously captured by an on-vehicle camera mounted on the police vehicle driven by the police officer. In order to efficiently support an operation of the police officer, recording of the video by the wearable camera and the on-vehicle camera are needed to be performed in a coordinated manner.

Japanese Patent Laid-Open No. 2021-27408 discloses a camera system described below as a technique for recording by a wearable camera and an on-vehicle camera in a coordinated manner. The on-vehicle system includes an on-vehicle camera that can capture images of the surroundings of the vehicle, and an on-vehicle recorder that can record a first captured video captured by the on-vehicle camera. Subsequently, in response to receiving a predetermined alarm notification, recording of the first captured video to the on-vehicle recorder is started, and simultaneously the wearable camera is instructed to start recording of a second captured video. In response to the instruction to start recording, the wearable camera starts recording the second captured video and transmits the second captured video to the on-vehicle system. The on-vehicle system records, in the on-vehicle recorder, the first captured video and the second captured video in association with each other. Such an operation allows for coordinated recording of the video of the wearable camera and the on-vehicle camera.

Such a coordinated operation is important not only between cameras but also a case where the video is recorded by the camera and the voice is recorded by a microphone. For example, let us consider a case of a system including a camera and a microphone that can wirelessly transmit voice to the camera, in which the camera has a video recording function, and also the microphone independently has a voice recording function. In this case, a case is conceivable that a state may happen in which the voice is recorded at the microphone side but the video is not recorded at the camera side when the coordination between the camera and the microphone may not successfully performed. On the contrary, there may arise a problem such that the video is recorded but the voice is not recorded. In addition, it is also conceivable that the start timings of recording the video at the camera side and recording the voice at the microphone side may deviate from each other.

SUMMARY OF THE INVENTION

The present invention has been made in view of the aforementioned problems, making it possible to perform recording of the image by the image capturing apparatus and recording of the voice by the microphone in good coordination, in a system including an image capturing apparatus and a microphone that can perform wireless communication.

According to a first aspect of the present invention, there is provided an image capturing apparatus comprising: an image capturing device configured to capture an image; at least one processor or circuit configured to function as: an acquisition unit configured to acquire a video recording instruction of the image captured by the image capturing device; a video recording unit configured to perform video recording of the image in response to the video recording instruction; and a control unit configured to control such that a video recording start signal notifying a start of video recording is wirelessly transmitted in response to the video recording instruction.

According to a second aspect of the present invention, there is provided a microphone apparatus comprising: a microphone device configured to collect voice; at least one processor or circuit configured to function as: a transmission unit configured to wirelessly transmit, to an image capturing apparatus, a video recording instruction that starts video recording of an image; a reception unit configured to wirelessly receive, from the image capturing apparatus, a video recording start signal notifying a start of the video recording; and a voice recording unit configured to perform voice recording of the voice collected by the microphone device, in response to the video recording start signal.

According to a third aspect of the present invention, there is provided an image capturing system comprising an image capturing apparatus and a microphone apparatus connected to be wirelessly communicable with each other, wherein the image capturing apparatus includes an image capturing device configured to capture an image; at least one processor or circuit configured to function as: an acquisition unit configured to acquire a video recording instruction of the image captured by the image capturing device; a video recording unit configured to perform video recording of the image in response to the video recording instruction; and a control unit configured to control such that a video recording start signal notifying a start of video recording is wirelessly transmitted in response to the video recording instruction, and the microphone apparatus includes: a microphone device configured to collect voice; at least one processor or circuit configured to function as: a transmission unit configured to wirelessly transmit the video recording instruction to the image capturing apparatus; a reception unit configured to wirelessly receive the video recording start signal from the image capturing apparatus; and a voice recording unit configured to perform voice recording of the voice collected by the microphone device, in response to the video recording start signal.

According to a fourth aspect of the present invention, there is provided a control method of an image capturing apparatus comprising an image capturing device configured to capture an image, the method comprising: acquiring a video recording instruction of the image captured by the image capturing device; video recording of the image in response to the video recording instruction; and controlling such that a video recording start signal notifying a start of video recording is wirelessly transmitted in response to the video recording instruction.

According to a fifth aspect of the present invention, there is provided a control method of a microphone apparatus comprising a microphone device configured to collect voice, the method comprising: wirelessly transmitting, to an image capturing apparatus, a video recording instruction that starts video recording of an image; wirelessly receiving, from the image capturing apparatus, a video recording start signal notifying a start of video recording; and voice recording of the voice collected by the microphone device, in response to the video recording start signal.

Further features of the present invention will become apparent from the following description of exemplary embodiments with reference to the attached drawings.

BRIEF DESCRIPTION OF THE DRAWINGS

FIG. 1 is a block diagram illustrating a configuration of an image capturing system according to an embodiment of the present invention;

FIG. 2 is a diagram illustrating an appearance of a camera;

FIG. 3 is a diagram illustrating an appearance of a wireless microphone;

FIG. 4 is a schematic diagram illustrating an actual use state of the camera and the wireless microphone;

FIGS. 6A and 6B are flowcharts illustrating an operation when the second video recording button of the wireless microphone is pressed;

FIGS. 8A and 8B are flowcharts illustrating an operation when the first video recording button provided on the camera body is pressed.

DESCRIPTION OF THE EMBODIMENTS

Figure 5:
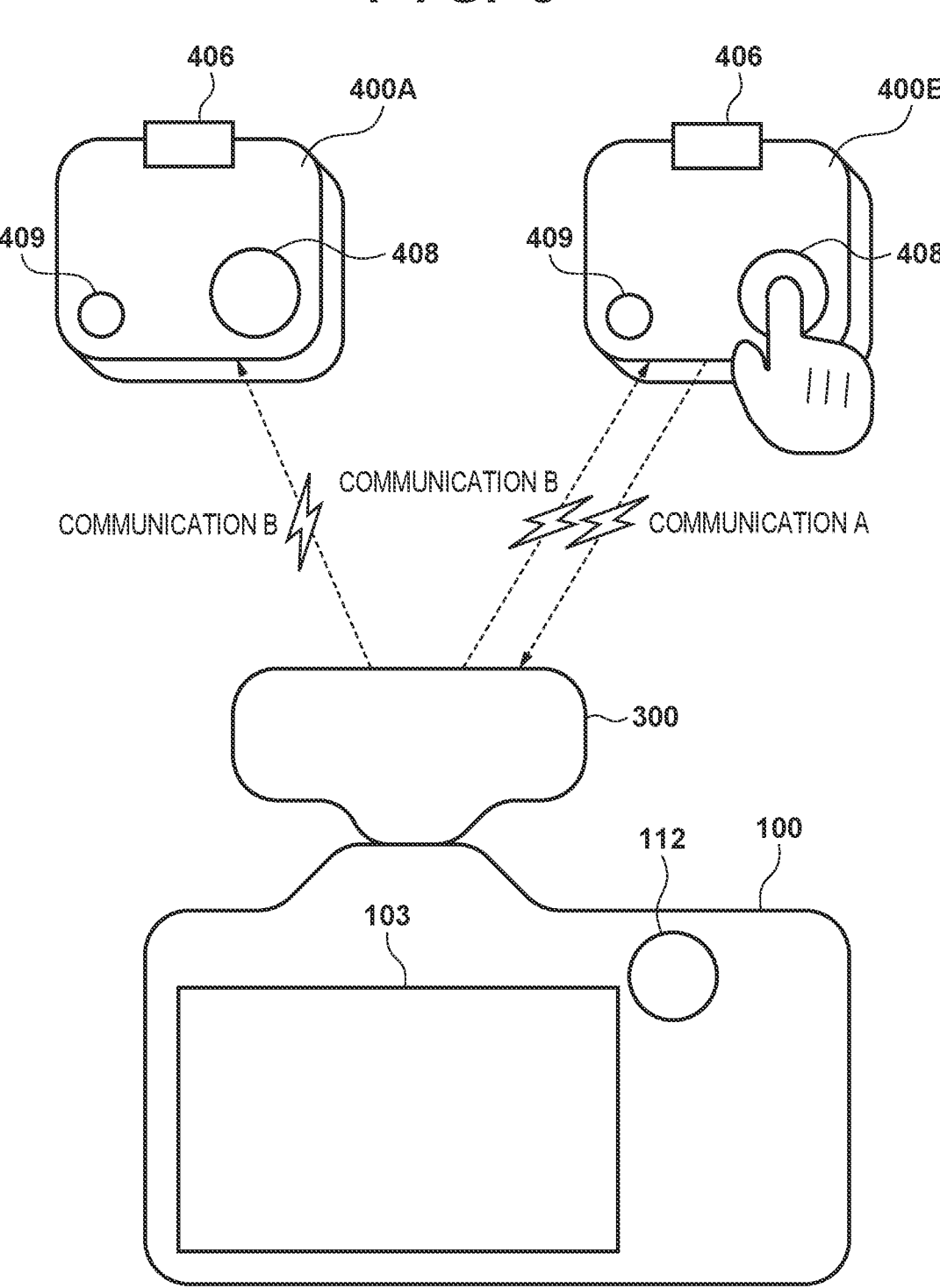
FIG. 5 is a diagram illustrating a communication flow when a second video recording button of the wireless microphone is pressed.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Basic Configuration of Image Capturing System)

FIG. 1 is a block diagram illustrating a configuration of an image capturing system 1000 according to an embodiment of the present invention.

Note that one or more of functional blocks illustrated in FIG. 1 may be implemented by hardware such as an ASIC and a programmable logic array (PLA), or may be implemented by causing a programmable processor such as a CPU and an MPU to execute software. The functional blocks may also be implemented by combination of software and hardware. Accordingly, in the following description, even when different functional blocks are described as operating subjects, the same hardware may be implemented as a subject.

In FIG. 1, an image capturing system 1000 includes a digital camera (referred to as camera, in the following) 1 and a wireless microphone 400 that can communicate with the camera 1. The camera 1 includes a camera body 100, a lens unit 200 attachable to and detachable from the camera body 100, and a voice reception unit 300 configured to wirelessly receive voice signals.

In the following, description will be provided assuming that the camera 1 is in a state where the lens unit 200 and the voice reception unit 300 are attached to the camera body 100. Although the present embodiment will be described for a case where the camera body 100, the lens unit 200, and the voice reception unit 300 are separate units, the camera 1 may have a configuration in which the camera body 100 and the lens unit 200 are integrated together. In addition, the camera body 100 and the voice reception unit 300 may be integrated together.

First, a configuration of the camera body 100 will be described. In FIG. 1, a camera control unit 101 includes, inside the camera control unit 101, a microcomputer (CPU) configured for controlling, and comprehensively controls operation of each unit in the camera 1. In addition, the camera control unit 101 also controls driving of an image sensor 106.

A shutter 104 includes light shielding members corresponding to a front curtain and a rear curtain of a so-called focal plane type, and controls the charge accumulation period in the image capturing element 106 by changing the light shielding state of the image sensor 106. A shutter driving unit 105 drives the shutter 104. Here, although the shutter 104 is used to control the exposure period when capturing a still image, it is left in an open state when a moving image is captured.

The image sensor 106 is a charge-storage-type solid-state image sensor such as a CMOS including a plurality of pixels that are so-called X-Y address type and two-dimensionally arranged. The image sensor 106 photoelectrically converts (performs image capturing of) light flux of a subject and outputs image data.

A captured image signal processing unit 107 performs various processing on image data output from the image sensor 106. For example, the captured image signal processing unit 107 performs amplification of image data, A/D conversion processing from analog image data to digital image data, various correction processing of the A/D-converted image data, compression processing into a predetermined compression format, or the like.

A timing generation unit 108 outputs various timing signals to the image sensor 106 and the captured image signal processing unit 107. A memory unit 111 can record data related to operation of the camera 1 and various data acquired by the camera 1. The memory unit 111 of the present embodiment includes a ROM area as a non-volatile memory, and a RAM area as a volatile memory.

A first storage medium control I/F unit 109 is an interface configured for recording of captured image data or moving image data, into a first storage medium 110, or reading of image data or moving image data, from the first storage medium 110. The first storage medium 110 including a semiconductor memory or the like is attachable to and detachable from the camera body 100 and records various data such as image data.

A display apparatus 103 includes a Thin Film Transistor driven type Liquid Crystal Display (TFT type LCD) or the like, and can display acquired still images or moving images. The display driving unit 102 causes the display apparatus 103 to display image data or the like.

A first video recording button 112 is a button that serves as a trigger (video recording instruction) of video recording of the moving image in the camera body 100. A user can input an instruction to start the video recording by pressing operation for the first video recording button 112. Upon detecting that the first video recording button 112 is pressed, the camera control unit 101 controls the lens unit 200, the image sensor 106, the captured image signal processing unit 107 or the like to capture the moving image. Simultaneously, the camera control unit 101 transmits a video recording start signal to a voice reception control unit 301 of the voice reception unit 300. The voice reception control unit 301 transmits the video recording start signal to a first wireless transmission and reception unit 302, and further, the first wireless transmission and reception unit 302 transmits the video recording start signal to the outside by a wireless radio wave.

Next, a configuration of the lens unit 200 will be described. In FIG. 1, a lens control unit 201 includes a microcomputer for lens (LCPU) inside the lens control unit 201, and controls operation of the lens unit 200. Here, the camera control unit 101 and the lens control unit 201 can communicate with each other via a terminal group provided on the camera body 100 side and a terminal group provided on the lens unit 200 side, in a state where the lens unit 200 is attached to the camera body 100.

An image capturing lens group 202 includes a focus lens, a shift lens, a zoom lens or the like, and guides the light flux of the subject toward the image sensor 106. A lens driving apparatus 203 drives the image capturing lens group 202 and drives the lens unit 200 such that, for example, a focal point of the focus lens may be brought into focus on the subject. A diaphragm 204 adjusts the amount of light from the subject guided into the camera 1 by the image capturing lens group 202. A diaphragm driving unit 205 drives the diaphragm 204.

Next, a configuration of the voice reception unit 300 will be described. The voice reception control unit 301 includes a microcomputer (CPU) for voice reception control inside the voice reception control unit 301, and controls the voice reception unit 300. Here, the camera control unit 101 and the voice reception control unit 301 can communicate with each other via a terminal group provided on the camera body 100 side and a terminal group provided on the voice reception unit 300 side, in a state where the voice reception unit 300 is attached to the camera body 100. In addition, the first wireless transmission and reception unit 302 of the voice reception unit 300 can wirelessly communicate with a second wireless transmission and reception unit 402 of the wireless microphone 400, which will be described below.

Next, a configuration of the wireless microphone 400 will be described. A voice transmission control unit 401 includes a microcomputer (TMPU) for the control of the wireless microphone in the voice transmission control unit 401, and controls operation of the wireless microphone 400. Here, the second wireless transmission and reception unit 402 can wirelessly communicate with the first wireless transmission and reception unit 302 of the voice reception unit 300.

The microphone unit 403 collects, and converts into a voltage signal, ambient voice and voice of a person wearing the wireless microphone 400. A voice processing unit 404 performs processing such as a gain processing or a filtering processing on the converted voltage signal to convert the voltage signal into a digital voice signal. The voice transmission control unit 401 transmits the converted digital voice signal to the second wireless transmission and reception unit 402. The second wireless transmission and reception unit 402 transmits the digital signal to the outside by a radio wave.

A battery 407, which is a power source of the wireless microphone 400, supplies power to the voice transmission control unit 401 while a power source SW (not illustrated) is on.

A second video recording button 408 is a button that triggers the camera body 100 to perform the video recording of the moving image. When the voice transmission control unit 401 has detected that the second video recording button 408 is pressed, the voice transmission control unit 401 transmits an ON signal (video recording instruction signal) of the video recording button to the second wireless transmission and reception unit 402. The second wireless transmission and reception unit 402 transmits the ON signal of the video recording button to the outside by a wireless radio wave.

The second storage medium control I/F unit 405 is an interface configured for recording of collected voice data, into the second storage medium 406. The second storage medium 406 records the voice data as a backup, in a case in which the voice cannot be transmitted due to degradation of the radio wave state when the wireless microphone 400 is wirelessly transmitting the voice to the voice reception unit 300. The second storage medium 406 including a semiconductor memory or the like is attachable to and detachable from the wireless microphone 400, and records various data such as voice data.

While the voice data is being recorded in the second storage medium 406, an LED 409 lights up or blinks to inform the user that the voice recording is ongoing.

FIG. 2 is a diagram illustrating an appearance of the camera 1 in FIG. 1. The camera body 100 includes the first video recording button 112 that serves as a trigger for starting the video recording, and the display apparatus 103. FIG. 2 illustrates a state where the voice reception unit 300 is attached to the camera body 100. When the user presses the first video recording button 112, the camera 1 starts recording of the moving image (video recording).

FIG. 3 is a diagram illustrating an appearance of the wireless microphone 400 in FIG. 1. The microphone unit 403, the second video recording button 408, and the LED 409 configured for displaying voice recording are provided in the wireless microphone 400. By pressing the second video recording button 408, the camera starts recording of the moving image (video recording).

FIG. 4 is a schematic diagram illustrating an actual use state of the camera 1 and the wireless microphone 400. A person 500A and a person 500B are subjects to be captured by the camera 1. The person 500A and the person 500B respectively wear a wireless microphone 400A and a wireless microphone 400B, and collect their respective voices. The wireless microphone 400A and the wireless microphone 400B are wirelessly connected to the voice reception unit 300, and the collected voices of the person 500A and the person 500B are wirelessly transmitted to the voice reception unit 300. When the second video recording button 408 of at least one of the wireless microphone 400A and the wireless microphone 400B is pressed, the camera 1, which is wirelessly connected, starts the video recording of an image.

FIG. 5 is a diagram illustrating a communication flow when the person 500B has pressed the second video recording button 408 of the wireless microphone 400B, and FIGS. 6A and 6B are flowcharts illustrating the operation in this case. Referring to FIG. 5 and FIGS. 6A and 6B, processing performed when the person 500B has pressed the second video recording button 408 of the wireless microphone 400B will be described. In the following description of the flowchart, S indicates a step number.

S101, S121 and S141 in FIGS. 6A and 6B indicate the starting of the flowcharts of each operation of the camera 1, the wireless microphone 400A, and the wireless microphone 400B. When the user powers on the camera 1, the wireless microphone 400A and the wireless microphone 400B at S102, S122, and S142, operations of respective apparatuses are started.

Here, the operation is assumed for a case where the second video recording button 408 of the wireless microphone 400B is pressed, and therefore the following description will be provided assuming that the operation of the system is triggered by the pressing of the second video recording button 408 of the wireless microphone 400B. Noted that, in the following description, the voice transmission control unit 401 that is a control unit of the wireless microphone 400A will be referred to as a control unit 401A, and the voice transmission control unit 401 that is a control unit of the wireless microphone 400B will be referred to as a control unit 401B.

At S143, the control unit 401B determines whether or not the second video recording button 408 of the wireless microphone 400B is turned on. When the second video recording button 408 is OFF, the control unit 401B repeats the processing S143, or advances the processing to S144 when the second video recording button 408 is ON.

At S144, the control unit 401B wirelessly transmits the ON signal of the video recording button. This transmission corresponds to the communication A in FIG. 5.

In the camera 1, the camera control unit 101 determines at S104 whether or not the ON signal of the video recording button transmitted from the wireless microphone 400B at S144 is received. When the ON signal of the video recording button is received, the camera control unit 101 advances the processing to S105, or repeats the operation of S104 when the ON signal of the video recording button is not received.

At S105, the camera control unit 101 wirelessly transmits a video recording start signal via the first wireless transmission and reception unit 302 of the voice reception unit 300. This transmission corresponds to the communication B illustrated in FIG. 5. Note that, when the remaining capacity of the first storage medium 110 is not enough for recording images or such cases, the operation of the camera 1 is terminated without transmitting the video recording start signal.

At S125 and S145, the control unit 401A of the wireless microphone 400A and the control unit 401B of the wireless microphone 400B determine whether or not the video recording start signal transmitted from the camera 1 at S105 is received. When the video recording start signal is received, the control unit 401A and the control unit 401B respectively advance the processing to S126 and S146, or respectively repeat the processing S125 and S145 when the video recording start signal is not received.

At S126 and S146, the control unit 401A and the control unit 401B start the voice recording by the wireless microphone 400A and the wireless microphone 400B. In addition, at S106, the camera control unit 101 starts the video recording of the moving image being captured by the camera 1. Note that, at this time, the voice is wirelessly transmitted from the wireless microphone 400A and the wireless microphone 400B to the camera 1, and therefore the voice is also recorded in the first storage medium 110 with the moving image.

By the aforementioned operation, the video recording of the moving image captured by the camera 1 and the voice recording of the voice collected by the wireless microphone 400A and the wireless microphone 400B are synchronously started. Next, an operation of synchronously stopping the video recording and the voice recording will be described.

At S147, the control unit 401B determines whether or not the second video recording button 408 of the wireless microphone 400B is pressed. When the second video recording button 408 is pressed, the control unit 401B advances the processing to S148, or repeats the processing S147 when the second video recording button 408 is not pressed.

At S148, the control unit 401B wirelessly transmits the ON signal of the video recording button. This transmission corresponds to the communication A illustrated in FIG. 5.

At S108, the camera control unit 101 determines whether or not the ON signal (stop instruction signal) of the video recording button transmitted from the wireless microphone 400B at S148 is received. When the ON signal of the video recording button is received, the camera control unit 101 advances the processing to S109, or repeats the operation S108 when the ON signal of the video recording button is not received.

At S109, the camera control unit 101 wirelessly transmits a video recording stop signal via the first wireless transmission and reception unit 302 of the voice reception unit 300. This transmission corresponds to the communication B illustrated in FIG. 5.

At S129 and S149, the control unit 401A of the wireless microphone 400A and the control unit 401B of the wireless microphone 400B determine whether or not the video recording stop signal transmitted from the camera 1 at S109 is received. When the video recording stop signal is received, the control unit 401A and the control unit 401B respectively advance the processing to S130 and S150, or respectively repeat the processing S129 and S149 when the video recording stop signal is not received.

At S130 and S150, the control unit 401A and the control unit 401B terminate the voice recording by the wireless microphone 400A and the wireless microphone 400B. In addition, at S110, the camera control unit 101 stops the video recording of the moving image captured by the camera 1.

When the user turns off each of the power sources of the camera 1, the wireless microphone 400A and the wireless microphone 400B at S111, S131 and S151, operations of the camera 1, the wireless microphone 400A and the wireless microphone 400B are terminated.

As has been described above, in the present embodiment, a video recording start signal is transmitted from the camera to the wireless microphone after the camera is instructed to start the video recording. The wireless microphone starts the voice recording of the voice at the timing of receiving the video recording start signal. Accordingly, the wireless microphone can perform the voice recording at substantially the same timing as the video recording by the camera.

Although the present embodiment has been described for a case of using two wireless microphones, similar processing can be performed using one or more wireless microphones. In addition, although the present embodiment has been described to start and stop the video recording using the wireless microphone B, it is also possible to start the video recording using one of the plurality of wireless microphones and stop the video recording using another one of the plurality of wireless microphones.

Figure 7:
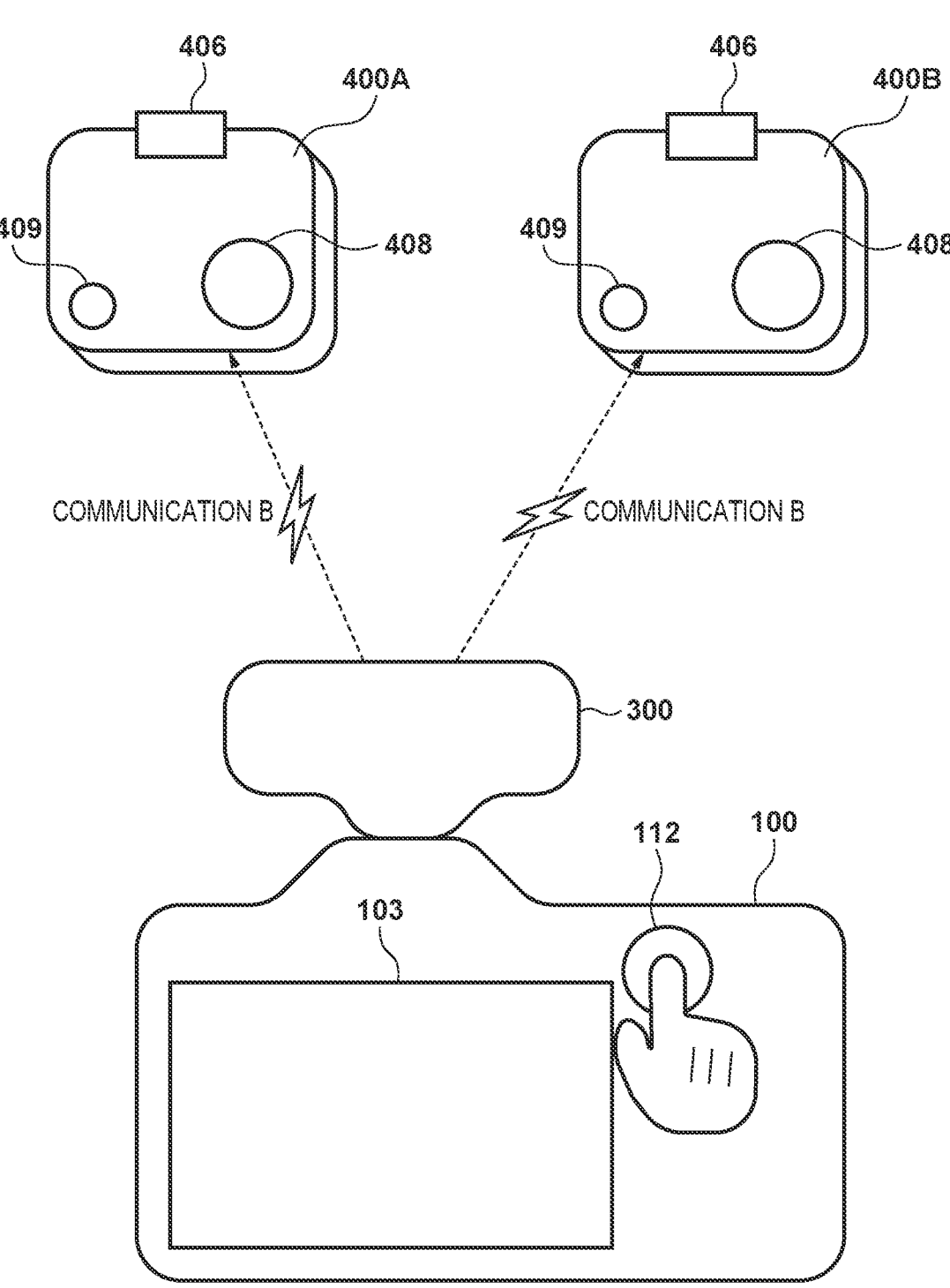
FIG. 7 is a diagram illustrating a communication flow when a first video recording button provided on the camera body is pressed.

Next, FIG. 7 is a diagram illustrating a communication flow when the user presses the first video recording button 112 provided on the camera body 100, and FIGS. 8A and 8B are flowcharts illustrating the operation in this case. Referring to FIG. 7 and FIGS. 8A and 8B, processing performed when the user presses the first video recording button 112 will be described.

S201, S221 and S241 in FIGS. 8A and 8B indicate the start of the flowcharts of respective operations of the camera 1, the wireless microphone 400A and the wireless microphone 400B. When the user powers on the camera 1, the wireless microphone 400A and the wireless microphone 400B at S202, S222 and S242, operations of respective apparatuses are started.

Here, the operation is assumed for a case where the first video recording button 112 of the camera body 100 is pressed, and therefore the following description will be provided assuming that operation of the system is triggered by pressing the first video recording button 112 of the camera body 100. Noted that, in the following description, the voice transmission control unit 401 that is a control unit of the wireless microphone 400A will be referred to as a control unit 401A, and the voice transmission control unit 401 that is a control unit of the wireless microphone 400B will be referred to as a control unit 401B.

At S204, the camera control unit 101 determines whether or not the first video recording button 112 is turned on. When the first video recording button 112 is OFF, the camera control unit 101 repeats the processing S204, or advances the processing to S205 when the first video recording button 112 is ON.

At S205, the camera control unit 101 wirelessly transmits a video recording start signal via the first wireless transmission and reception unit 302 of the voice reception unit 300. This transmission corresponds to the communication B in FIG. 7. Note that, when the remaining capacity of the first storage medium 110 is not enough for recording images or such cases, the operation of the camera 1 is terminated without transmitting the video recording start signal.

At S225 and S245, the control unit 401A of the wireless microphone 400A and the control unit 401B of the wireless microphone 400B determine whether or not the video recording start signal transmitted from the camera 1 at S205 is received. When the video recording start signal is received, the control unit 401A and the control unit 401B respectively advance the processing to S226 and S246, or respectively repeat the processing S225 and S245 when the video recording start signal is not received.

At S226 and S246, the control unit 401A and the control unit 401B start the voice recording of the voice by the wireless microphone 400A and the wireless microphone 400B. In addition, at S206, the camera control unit 101 starts the video recording of the moving image captured by the camera 1. Note that, at this time, the voice is wirelessly transmitted from the wireless microphone 400A and the wireless microphone 400B to the camera 1, and therefore the voice is also recorded in the first storage medium 110 together with the moving image.

By the aforementioned operation, the video recording of the moving image captured by the camera 1 and the voice recording of the voice collected by the wireless microphone 400A and the wireless microphone 400B are synchronously started. Next, an operation of synchronously stopping the video recording and the voice recording will be described.

At S208, the camera control unit 101 determines whether or not the first video recording button 112 is pressed. When the first video recording button 112 is pressed, the camera control unit 101 advances the processing to S209, or repeats the processing S208 when the first video recording button 112 is not pressed.

At S209, the camera control unit 101 wirelessly transmits a video recording stop signal via the first wireless transmission and reception unit 302 of the voice reception unit 300. This transmission corresponds to the communication B illustrated in FIG. 7.

At S229 and S249, the control unit 401A of the wireless microphone 400A and the control unit 401B of the wireless microphone 400B determine whether or not the video recording stop signal transmitted from the camera 1 at S209 is received. When the video recording stop signal is received, the control unit 401A and the control unit 401B respectively advance the processing to S230 and S250, or respectively repeat the processing S229 and S249 when the video recording stop signal is not received.

At S230 and S250, the control unit 401A and the control unit 401B stop the voice recording of the voice by the wireless microphone 400A and the wireless microphone 400B. At S210, the camera control unit 101 stops the video recording of the moving image captured by the camera 1.

When the user turns off each of the power sources of the camera 1, the wireless microphone 400A and the wireless microphone 400B at S211, S231 and S251, operations of the camera 1, the wireless microphone 400A and the wireless microphone 400B are terminated.

As has been described above, in the present embodiment, the video recording start signal is transmitted from the camera to the wireless microphone. The wireless microphone starts the voice recording of the voice at the timing of receiving the video recording start signal. Accordingly, the wireless microphone can perform the voice recording at substantially the same timing as the video recording by the camera.

Although the present embodiment has been described for a case of using two wireless microphones, similar processing can be performed using one or more wireless microphones.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-004705, filed Jan. 16, 2023, which is hereby incorporated by reference herein in its entirety.

What is claimed is:

1. An image capturing apparatus comprising:

an image capturing device configured to capture an image;

at least one processor or circuit configured to function as:

an acquisition unit configured to acquire a video recording instruction of the image captured by the image capturing device;

a video recording unit configured to perform video recording of the image in response to the video recording instruction; and a control unit configured to control such that a video recording start signal notifying a start of video recording is wirelessly transmitted to at least one external microphone apparatus in response to the video recording instruction, wherein the video recording start signal notifying a start of video recording is wirelessly received from a microphone apparatus external to the image capturing apparatus in response to a user pressing of a voice recording button of the external microphone apparatus.

2. The image capturing apparatus according to claim 1, wherein the acquisition unit acquires a stop instruction for stopping the video recording of the image, the video recording unit stops the video recording of the image in response to the stop instruction, and the control unit controls such that a stop signal for notifying a stop of video recording is wirelessly transmitted in response to the stop instruction.

3. The image capturing apparatus according to claim 2, wherein the acquisition unit acquires the stop instruction by wirelessly receiving the stop instruction.

4. The image capturing apparatus according to claim 3, wherein the acquisition unit wirelessly receives the stop instruction from a microphone apparatus external to the image capturing apparatus.

5. The image capturing apparatus according to claim 2, wherein the acquisition unit acquires the stop instruction by an operation of inputting the stop instruction from a user.

6. The image capturing apparatus according to claim 2, wherein the control unit controls such that the stop signal is wirelessly transmitted to a plurality of microphone apparatuses external to the image capturing apparatus.

7. The image capturing apparatus according to claim 1, wherein the acquisition unit acquires the video recording instruction by wirelessly receiving the video recording instruction.

8. The image capturing apparatus according to claim 7, wherein the acquisition unit wirelessly receives the video recording instruction from a microphone apparatus external to the image capturing apparatus.

9. The image capturing apparatus according to claim 1, wherein the acquisition unit acquires the video recording instruction by an operation of inputting the video recording instruction from a user.

10. The image capturing apparatus according to claim 1, wherein the control unit controls such that the video recording start signal is wirelessly transmitted to a plurality of microphone apparatuses external to the image capturing apparatus.

11. The image capturing apparatus according to claim 1, wherein the control unit does not transmit the video recording start signal when the video recording unit cannot record the image.

12. A microphone apparatus comprising:

a microphone device configured to collect voice;

at least one processor or circuit configured to function as:

a transmission unit configured to wirelessly transmit, to an image capturing apparatus, a video recording instruction that starts video recording of an image, wherein the video recording start signal that starts video recording is wirelessly transmitted in response to a user pressing of a voice recording button of the microphone apparatus;

a reception unit configured to wirelessly receive, from the image capturing apparatus, a video recording start signal notifying a start of the video recording being performed on the video recording apparatus in response to the user pressing of the voice recording button of the microphone apparatus;

a voice recording unit configured to perform voice recording of the voice collected by the microphone device, in response to the video recording start signal being received from the video recording apparatus.

13. The microphone apparatus according to claim 12, wherein the reception unit wirelessly receives, from the image capturing apparatus, a stop signal notifying a stop of the video recording, and the voice recording unit stops voice recording of the voice in response to the stop signal.

14. An image capturing system comprising an image capturing apparatus and a microphone apparatus connected to be wirelessly communicable with each other, wherein the image capturing apparatus includes an image capturing device configured to capture an image;

at least one processor or circuit configured to function as:

an acquisition unit configured to acquire a video recording instruction of the image captured by the image capturing device;

a video recording unit configured to perform video recording of the image in response to the video recording instruction; and a control unit configured to control such that a video recording start signal notifying a start of video recording is wirelessly transmitted to at least one external microphone apparatus in response to the video recording instruction, wherein the video recording start signal notifying a start of video recording is wirelessly received from a microphone apparatus external to the image capturing apparatus in response to a user pressing of a voice recording button of the external microphone apparatus, and the microphone apparatus includes:

a microphone device configured to collect voice;

at least one processor or circuit configured to function as:

a transmission unit configured to wirelessly transmit the video recording start instruction that starts video recording of an image on the image capturing apparatus, wherein the video recording start signal that starts video recording is wirelessly transmitted in response to the user pressing of the voice recording button of the microphone apparatus;

a reception unit configured to wirelessly receive the video recording start signal from the image capturing apparatus, notifying a start of the video recording being performed on the video recording apparatus in response to the user pressing of the voice recording button of the microphone apparatus;

a voice recording unit configured to perform voice recording of the voice collected by the microphone device, in response to the video recording start signal being received from the video recording apparatus.

15. A control method of an image capturing apparatus comprising an image capturing device configured to capture an image, the method comprising:

acquiring a video recording instruction of the image captured by the image capturing device;

video recording of the image in response to the video recording instruction; and controlling such that a video recording start signal notifying a start of video recording is wirelessly transmitted to at least one external microphone apparatus in response to the video recording instruction, wherein the video recording start signal notifying a start of video recording is wirelessly received from a microphone apparatus external to the image capturing apparatus in response to a user pressing of a voice recording button of the external microphone apparatus.

16. A control method of a microphone apparatus comprising a microphone device configured to collect voice, the method comprising:

wirelessly transmitting, to an image capturing apparatus, a video recording instruction that starts video recording of an image, wherein the video recording start signal that starts video recording is wirelessly transmitted in response to a user pressing of a voice recording button of the microphone apparatus;

wirelessly receiving, from the image capturing apparatus, a video recording start signal notifying a start of video recording being performed on the video recording apparatus in response to the user pressing of the voice recording button of the microphone apparatus; and voice recording of the voice collected by the microphone device, in response to the video recording start signal being received from the video recording apparatus.

17. A non-transitory computer-readable storage medium storing a program for causing a computer to execute each process of a control method of an image capturing apparatus comprising an image capturing device configured to capture an image, the method comprising:

acquiring a video recording instruction of the image captured by the image capturing device;

video recording of the image in response to the video recording instruction; and controlling such that a video recording start signal notifying a start of video recording is wirelessly transmitted to at least one external microphone apparatus in response to the video recording instruction, wherein the video recording start signal notifying a start of video recording is wirelessly received from a microphone apparatus external to the image capturing apparatus in response to a user pressing of a voice recording button of the external microphone apparatus.

18. A non-transitory computer-readable storage medium storing a program for causing a computer to execute each process of a control method of a microphone apparatus comprising a microphone device configured to collect voice, the method comprising:

wirelessly transmitting, to an image capturing apparatus, a video recording instruction that starts video recording of an image, wherein the video recording start signal that starts video recording is wirelessly transmitted in response to a user pressing of a voice recording button of the microphone apparatus;

wirelessly receiving, from the image capturing apparatus, a video recording start signal notifying a start of video recording being performed on the video recording apparatus in response to the user pressing of the voice recording button of the microphone apparatus; and voice recording of the voice collected by the microphone device, in response to the video recording start signal being received from the video recording apparatus.

* * * * *